US006999728B2

(12) United States Patent
Delaveau et al.

(10) Patent No.: US 6,999,728 B2
(45) Date of Patent: Feb. 14, 2006

(54) METHOD AND DEVICE FOR THE LOCATION OF A MOBILE TELEPHONE IN A COMMUNICATIONS NETWORK

(75) Inventors: François Delaveau, Le Plessis S/Marne (FR); Dieudonne Josset, Bois-Colombes (FR)

(73) Assignee: Thales, Paris (FR)

( * ) Notice: Subject to any disclaimer, the term of this patent is extended or adjusted under 35 U.S.C. 154(b) by 462 days.

(21) Appl. No.: 10/133,480

(22) Filed: Apr. 29, 2002

(65) Prior Publication Data

US 2002/0183074 A1 Dec. 5, 2002

(51) Int. Cl.
*H04B 17/00* (2006.01)

(52) U.S. Cl. .............................. 455/67.16; 455/456.1; 455/404; 455/433; 455/67.3; 455/432.1; 455/63.1; 455/63.4; 455/447; 455/450; 370/337; 370/335; 370/330; 342/373; 342/374; 342/372

(58) Field of Classification Search .............. 455/67.3, 455/433, 432.1, 447, 62, 63.1, 63.4, 67.16, 455/404.2, 456.1, 456.2; 370/335, 337, 330; 342/373, 374, 372
See application file for complete search history.

(56) References Cited

U.S. PATENT DOCUMENTS 6,122,510 A * 9/2000 Granberg .................... 455/433
6,169,732 B1 * 1/2001 Hetherington et al. ...... 370/335
6,192,244 B1 * 2/2001 Abbadessa .................. 455/436
6,223,040 B1 * 4/2001 Dam .......................... 455/447
6,233,437 B1 * 5/2001 Klenner ................... 455/115.2
6,430,239 B1 8/2002 Ferreol
6,587,080 B1 * 7/2003 De Champlain et al. ... 342/450
6,590,535 B1 * 7/2003 De Champlain et al. ... 342/450
6,598,009 B1 * 7/2003 Yang .......................... 702/152
6,778,655 B1 * 8/2004 Veschi et al. .......... 379/215.01

FOREIGN PATENT DOCUMENTS

EP 1 031 847 8/2000
WO WO 97/39598 10/1997
WO WO 99/09778 2/1999
WO WO 99/27735 6/1999
WO WO 00/14985 3/2000

* cited by examiner

*Primary Examiner*—Marceau Milord
(74) *Attorney, Agent, or Firm*—Oblon, Spivak, McClelland, Maier & Neustadt, P.C.

(57) ABSTRACT

Method and device for the detection of one or more mobiles within a communications network, the method comprising at least one step for the "acquisition" of at least one RACH type signal exchanged between a mobile and a base station of the network and a step to measure the angle of arrival of the signal, the measurement step being synchronized with a parameter of the exchanged signal. Application to the GSM network.

38 Claims, 4 Drawing Sheets

METHOD AND DEVICE FOR THE LOCATION OF A MOBILE TELEPHONE IN A COMMUNICATIONS NETWORK

BACKGROUND OF THE INVENTION

1. Field of the Invention

The present invention relates to a method and a system for detecting and/or locating the presence of one or more mobile telephones (hereinafter called mobiles) in a communications network, by intercepting a signal exchanged between a mobile and the network. The network is for example a cellular communications network.

The invention can be applied especially in GSM networks.

It is used for example to detect and locate emergency calls.

It can also be applied to the measurement of road traffic density by the counting of the mobiles present in a given area, for example on a roadway.

It can also be applied in all cellular communications networks with known frequency and time-related characteristics, where the signals exchanged between a mobile and a base station have waveforms with a given structure and sequences of which there is a priori knowledge (for example learning sequences, synchronisation code etc).

2. Description of the Prior Art

The prior art describes various methods and devices suited to locating emergency calls and/or to measuring traffic density by means of the GSM network.

One approach, for example, lies in modifying the mobile radio stations or the SIM (Subscriber Identity Mobile) card in order to introduce a locating function within the radio mobile unit (which is generally of the GPS mini-receiver type or the type used for field measurements on server cells and neighboring cells) and a function of sending the results of measurements from the mobile, in the form of short messages, to the network, which uses them to locate the mobile. An approach of this kind however implies the adaptation or renewal of existing GSM radio mobile units. The number of these units corresponds at the present time to several hundred million all over the world.

Another approach consists in exploiting the network signaling function on the "Abis" interface or on the A interface. Using software that works at the network level, it is possible to locate radio mobile units by implementing various methods such as the measurement of radioelectrical fields, time difference of arrival (TDOA), tracking between cells etc. The interfaces <<Abis>> and <<A>> are described, for example, in X. Lagrange, P. Gdlewski and S. Tabbane, "Réseaux GSM-DCS" (GSM-DCS Networks) Editions Hermès Science, $4^{th}$ edition.

However, these approaches have certain drawbacks:

- they lead to low precision and doubtful reliability of the location obtained, especially because of strong fluctuations in the propagation of the radioelectrical signals and the relatively low bit rate of the GSM system, which is 270 k bauds, for example,
- they necessitate the replacement of the existing pool of mobiles (GPS receiver).

SUMMARY OF THE INVENTION

An object of the present invention is a device and a method that can be used especially to detect mobiles present in a cellular type network or in a region covered by the network. The data are exploited in order to deduce, for example, road traffic density or again to locate emergency calls.

The invention relates to a method for the detection of one or more mobiles within a communications network. The method comprises at least one step for the "acquisition" of at least one signal exchanged between a mobile and a base station of the network and a step to measure the angle of arrival of the signal, the measurement step being synchronized with a parameter of the exchanged signal. The base station corresponds to the entry point of a mobile into a network.

The exchanged signal is, for example, sent from mobile to a base station of the network. The mobile may be called up at given points in time.

According to an alternative mode of implementation, the method comprises a step for dating the exchanged signal.

The step for measuring the angle of arrival is carried out for example for one or more values of angles in order to locate the mobile or mobiles.

The method may comprise a step to determine the propagation time of the signal between a mobile and a base station.

It may also comprise a step for the processing of the signal received by the base station, such as a demodulation step in order to determine the nature of the call and/or a step for sorting the signal on the basis of the information on the date and the demodulated data.

The method comprises for examples a step for counting one or more mobiles present in a given place in order to determine the corresponding density of mobiles.

The method can be applied to GSM communications networks and/or by using exchanged signals of the RACH type.

The invention also relates to a device for the detection of one or more mobiles in a communications network. The device comprises at least:

- one element adpated to receive the signals exchanged between one or more mobile stations and the network,
- one element to synchronize the activation of the measurement of at least one angle of arrival of the exchanged signal,
- a processor adapted to processing the signals received and managing the different elements The element for the reception of the exchanged signals is, for example, an antenna network comprising five antennas.

The synchronization element and the signal reception element are integrated in one and the same element.

The processor is adapted, for example, to making goniometric measurements and managing the synchronization of the goniometry shots. It may also comprise a local application adapted to managing the information given by an interface of the Abis network.

The processor comprises for example a system application in order to centralize the data coming from the different local applications.

The invention also relates to a system for the detection of one or more mobiles within a communications network, comprising at least one device for the detection of one or more mobiles comprising one of the above-mentioned characteristics.

The direct exploitation of the radioelectrical signal sent and/or received by the radio mobile stations, independently of the cellular network that receives the system, the structure of the mobile stations and the radio electrical signals, gives the invention the following advantages in particular:

- the mobiles need no modification; the invention works with existing mobiles,
- no specific management tool is required within the network; the measurements are made independently of the network,
- the method can be coupled with existing network management procedures or it can be associated with mapping type applications.

BRIEF DESCRIPTION OF THE DRAWINGS

Other advantages and characteristics of the invention shall appear more clearly from the following description of exemplary embodiments of the device and of the method according to the invention given by way of an illustration, with reference to the appended figures, of which.

MORE DETAILED DESCRIPTION

In order to provide for a clearer understanding of the present invention, the following description is given with reference to the detection of mobiles in a GSM network by way of an illustration that in no way restricts the scope of the invention.

Figure 1:
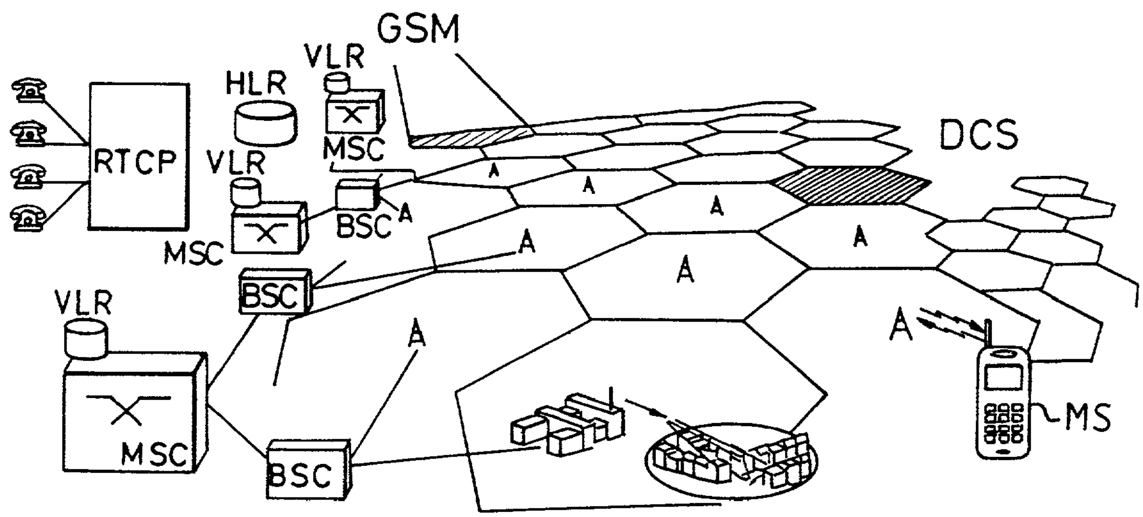
FIG. 1 shows an exemplary application of the invention in a GSM cellular network.

FIG. 1 briefly recalls an exemplary architecture of a GSM cell network comprising, for example a mobile station MS, a radio sub-system having a controller function carried out by the BSCs (Base Station Controllers) and a transmission function carried out by the BTSs (Base Transmitter Stations), a network sub-system comprising, for example, an automatic branch exchange comprising a VLR (Visitor Location Register) and an HLR (Home Location Register). An architecture of this kind is known to those skilled in the art and more detailed information may be found in the reference work cited further above.

Data transmission between the network and the mobiles (or the subscribers) uses for example BCCH/CCCH type multiframes (with common broadcast channels/control channels).

The frame exchanged between the base station and mobile comprises, for example, information necessary for synchronizing angle measurements or goniometric measurements according to a scheme that shall be explained further below in the description.

Figure 2:
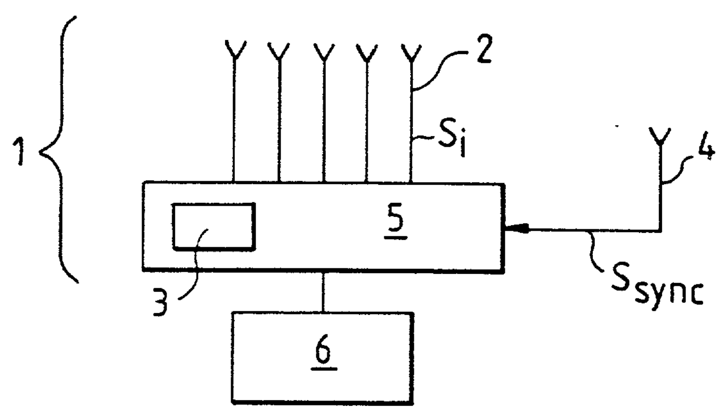
FIG. 2 shows an exemplary radioelectrical sensor according to the invention.

The invention consists especially of the use, within a cellular communications network, of a specific sensor for which an exemplary architecture is given in FIG. 2. This sensor is based on a hardware architecture of interference analysis or narrow-band terrestrial one-dimensional radio direction-finding.

The radioelectrical sensor 1 described in FIG. 2 comprises a device 2 for the reception of signals exchanged between a mobile and the base station of a network (FIG. 1), for example a goniometric antenna network comprising five antennas, one antenna switch 3 to carry out the calibration of the antennas, a reception antenna 4 used for example to synchronize the point in time at which the method will activate an angle measurement or goniometric operation. The elements 2, 3 and 4 together form a receiver 5 comprising six channels with calibration module. This receiver is linked with a processor 6 or computer equipped with a software program adapted especially to managing the different elements of the radioelectrical sensor and to detecting and processing the signals received and, possibly, other information coming from external elements.

The antenna is, for example, a calibrated network antenna. If necessary, it may be associated with filters at the head, centered on the GSM bands, more generally on the frequency bands of the network, in order to cancel the reception of co-site transmissions and thereby facilitate the installation of the system, for example on roadside pylons, in the vicinity of FM transmitters etc or again in any environment where the planned space is limited.

The switch 3 is a device known to those skilled in the art. It enables the calibration of the reception channels in amplitude and phase.

The six-channel receiver is for example a 300 kHz instantaneous band receiver provided with a calibration module for the phase and calibration of the sensor. Five channels are used for the goniometry for example (they receive the signals Si) and the sixth channel is used to synchronize the activation of the angle measurement or goniometry operation (this channel sends a synchronization signal Ssync).

The computer 6 is for example an industry-range PC type of microcomputer provided with two DSP boards specific to the driving of the receiver and the data-processing and signal-processing functions. It incorporates for example various acquisition and signal-processing boards which are equipped with software programs to run the measurement algorithms on the signals exchanged between the mobile or mobiles and the network. The software programs will be chosen for example as a function of the signal exchanged during the access to the network (known as RACH or random access channel signals) in the cellular networks.

The software with which the computer is equipped is adapted to detecting signals received by a mobile or a base station of the cellular network and to synchronizing the activation of the goniometric measurement by using, for example, a characteristic of the signal exchanged within a network.

According to one embodiment, it comprises:

- a local "goniometry" operation to manage the synchronization of the goniometry shots (the points in time when the goniometric measurements are made) and the exploitation of the results of goniometric measurements,
- a local <<Abis>> application to manage the information provided by the Abis interface, especially the type of access, a response to a location update (LU) request or an emergency call,
- a system application, centralizing if necessary the data coming from the different local applications.

The software program may also have a man-machine interface to insert planning and scheduling data pertaining to the network and transmit results obtained locally by the method according to the invention towards an appropriate processing center (not shown in the figures).

The computer has for example an input on the BTS (Base Transceiver Station). This is an apparatus consisting of radio transceivers and constituting the interface between the BSC (Base Station Controllers) and the mobiles (Abis probe).

In the case of an application pertaining to RACH signals, the sensor is adapted to implementing the following steps:

- the extraction of network data broadcast in the BCCH (Broadcast Control Channel) messages during the preparation phase,
- the external synchronization of the triggering of the goniometric measurement operation on a TDMA (Time Division Multiple Access) frame sent out by a cell or by the BTS depending on whether it is done according to the Abis interface or the BCCH if necessary, the detection and dating of the arrival of the RACH signals for example, the counting of the mobiles transmitting a RACH signal for example.
- the goniometry of the mobiles sending out a RACH signal.

Without departing from the framework of the invention, it is possible to use several sensors organized in a system. These sensors can be used through means providing links to a data-processing center in order to produce measurements of traffic density (FIG. 3) or to give the location of a call to the emergency call services.

According to another mode of implementation, the sensor according to the invention is associated with peripheral devices to facilitate the extraction of "network" data (in the preparation or initialization phase). The devices are for example logging or recording mobiles, GPS location systems, an extract from the network planning and scheduling data base given by the telecommunications operator, probe-type network devices for example on the Abis interface with the associated filters.

Examples of integration of the sensor into more complex structures are given in FIGS. 3 to 6.

Before explaining the implementation of such structures, the principle of the method implemented is explained here below in the case of a GSM network in which the RACH signals sent out by mobiles on standby are used.

Steps Implemented in the Method

The method according to the invention comprises, for example, the following steps:

Step 1

1—A sensor, as described with reference to FIG. 2, is positioned on the rising beacon frequencies (BCCH frequencies minus the duplex frequency difference) corresponding to the server cell and/or to the neighboring cells. The frequencies are, for example, either pinpointed by means of a logging mobile or any other radioelectrical apparatus used to make a record of the planning and scheduling of the network (the geographical distribution of the frequencies on the BTS) or pooled in a data base provided by the telecommunications operator who owns the network.

Step 2

2—calling up one or more mobiles on standby in order to prompt transmissions on their part (the generation of a transmission on the RACH channel for example). The transmissions are, for example, called for by means of a network procedure such as the <<location update>> procedure or the <<paging request>> procedure, or again naturally by using the planned settings (the case in which the excitation of the RACH channel is done outside a location update operation) for the management of the network. They may also be enforced by means of appropriate transmitters such as mobile base stations programmed for this purpose.

The mobile sends out a RACH signal, for example during a location area change or location zone change (ZLAC), a paging procedure, a location update procedure initiated by the mobile or an incoming/outgoing call or following a network loss (caused for example by scrambling or any other type of malfunction)

It is also possible to make use of periodic location update procedures with periods reduced to the hyperframe duration (about 6 minutes).

Step 3

3—the computer 6 registers and processes the signals received in deferred time or processes the signals in real time at statistically significant time intervals given the period of the transmissions of the RACH signals. The time intervals depend, for example, on the mobile call-up method chosen in the step 2.

Step 4

4—the computer 6 activates a step for the detection and counting of the access signals and mobiles on standby according to the methods known to those skilled in the art.

Step 5

5—in a fifth step, the computer activates an angle measurement or goniometric measurement step. The measurement is activated for example by making use of

- the information contained in the synchronization channel or SCH present in the signaling channels broadcast on the <<beacon frequency>> of the cell going from the network to the mobile,
- information carriers for the synchronization of the frames, and
- the identification of the base transmitter station (BTS) and of the cell.

The synchronization is, for example, done as a function of the radioelectrical environment and the hardware structure considered for the final product by single-channel techniques or by multi-channel techniques that are highly sensitive and perform well in dense multiple-source environments.

The five steps described in detail here above may be associated with the following steps:

6—the goniometry measurement step may be associated with a measurement of the propagation time of the mobile with respect to the BTS, (measurement of the Timing Advance): this makes it possible to associate a measurement of distance with the angle measurement and thus locate the mobile more efficiently.

7—by adding a step for the demodulation of the RACH signal intercepted on the radio channel (this is possible if the collaboration with the operator network is not sufficient) to the angle measurements or goniometric measurements, measurements of dating and mobile propagation time described here above, the computer may deduce the establishment cause (periodic location update, response to a paging operation, 112 emergency call expressed by the presence of a specific code in the message sent in the RACH signal); as well as 8—a recognition of the call making it possible to identify the establishment cause (periodic location, emergency call, etc.) and an identifier defining the caller (RA identifier of the RACH message for the GSM network) enabling a sorting of the calls.

The collaboration with the communications network makes it possible especially:

- to work on the access signals sent out during a request for periodic location update of the mobile whose network controls the period which is greater than or equal to 6 minutes and whose probes on the Abis interface may give:

the geographic location at the cell level, the date, the establishment cause (location update, incoming/outgoing call, emergency call, etc.), to cover, in principle, large geographical expanses by simplifying the work of the radio part of the invention.

The location of the mobile is obtained, for example, by combining the measurements of the angle of arrival and the measurements of the traveling time or again by combining the measurements of the angle of arrival made on several sensors.

First Exemplary Application: Estimation of Road Traffic

In an exemplary implementation of the method according to the invention, the road traffic density is assessed by counting up the number of detections/locations of mobiles per elementary "road portion". The basis of this function is the capacity to count transmissions associated with a location implementing the steps 1, 2 and 3 mentioned here above for the method.

When this application is associated with a demodulation of the RACH signals (above-mentioned step 7) either from the radio signal or by taking them at the Abis interface, it is possible to sort out the different calls such as location update, incoming/outgoing call etc.

Advantageously, the results of the road traffic density assessment can be improved by using the SDCCH and TCH signals on the corresponding frequencies, according to the lists of the frequencies allocated to the mobile.

These frequencies are either available after demodulation of the BCCH channels (analyzer terminal) or given by the network planning and scheduling system. To this end, an association of the different RACH signals sent out by a same mobile is necessary: this association is set up by exploiting these signals and the parameters, if any, demodulated in the radio signal and extracted from the signaling on the Abis interface (for example, known by the expressions <<establishment cause>> and <<random access>>).

Figure 3:
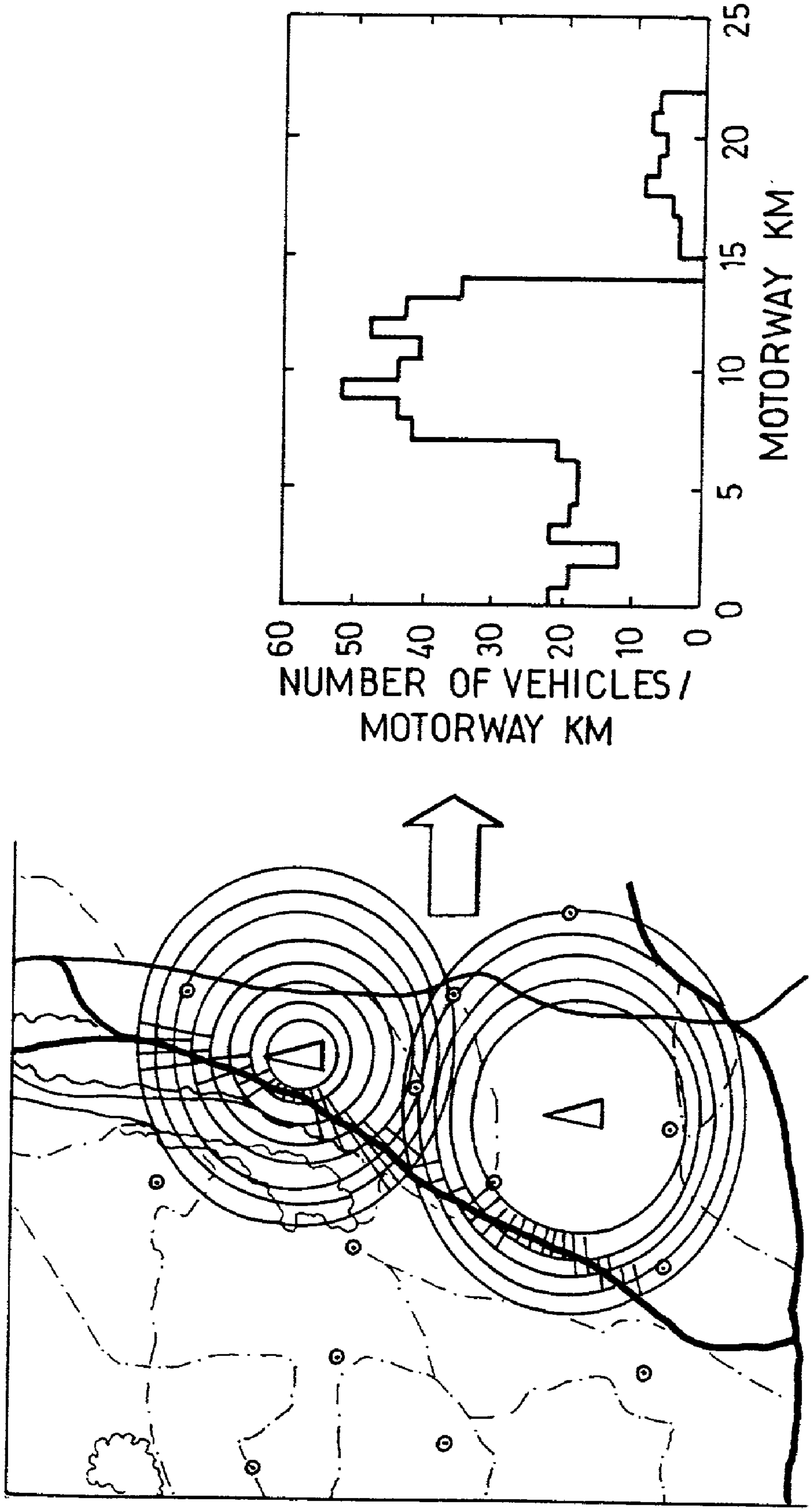
FIG. 3 shows an exemplary general structure of a system using a sensor according to the invention.

The data produced take the form given in FIG. 3 relating to a geographical area comprising two sensors 10, 11 having characteristics identical to those of the sensor of FIG. 2. These two sensors detect the mobiles present in two areas 12, 13. The graph gives the number of vehicles detected per motorway-km (y-axis) as a function of the motorway-km concerned (x-axis)

According to another alternative implementation of the method, it is possible to separate mobiles present on the roads and also the traffic according to its direction without the identity of the mobile being known to the radioelectrical counting and locating system. To this end, several complementary options may be considered. Some of them are listed here below by way of an indication:

Use of Standardized Network Procedures Already Implanted in the GSM Cellular Communications Network The operation of calling up the mobiles is prompted in certain cells of the network by a modification of the periodic "location update" procedures (indicated in the BCCH).

Probes on the Abis interfaces of the cells covered by the system (for example the cells managed by a same BSC) enable the calls to be sorted out and simplifies the work of the radio direction-finder by informing it of:

The cell,

The sending date (by tracing back the signaling),

The identity of the RACH caller (RA identifier), the establishment cause,

As the case may be, the identity of the mobile (TMSI),

As the case may be, the direction of transit of the mobile.

Use of Active Procedures on the GSM Cellular Communications Network

Other call-up operations are possible, implementing techniques specific to network management and to the logic of the itinerancy procedures:

Method 1: the choice of the mobiles interrogated is made by the MSC which selects the mobiles to be called up, by time slot and geographic area, using location update or paging procedures. These mobiles may be present anywhere in the geographic call-up area, on or off the roadway, in a specific direction of transit or otherwise, and it is then the counting and locating system that detects them on the roadways and separates the directions of transit. The separation of the directions of transit may be done, for example, in this case by two counting measurements at a distance of some km (on different cells).

Method 2: The choice of the mobiles to be called up is made during a change in location area (listing of mobiles for subsequent selection by the MSC of the mobiles on the basis of the TMSI for example). For this purpose, one possibility is that the network introduces a boundary between the location areas crossing the roadways. At this level, this choice of the mobiles makes no distinction between the directions of transit or even between the mobiles actually present on the roadway and the others. The counting and locating system, deployed at some kilometers upline or downline, then detects only the mobiles on the roadway corresponding to one of the directions of transit.

Method 3: The call-up of the mobiles is done in a sufficiently local way by means of a transmitter or a BTS with restricted range (confined to the few hundreds of meters before or after a tollgate, on a road portion in which the directions are separated by the relief, a curve, a tunnel, or it may be done from a bridge, etc.) so that only the mobiles corresponding to a direction of traffic respond to the call-up. These mobiles will then be called up subsequently by a targeted location update procedure.

Method 4: The mobiles are called up as here above (method 3) but it is done twice, in two successive location areas with small coverage (of some hundreds of meters, for example, one location area before a tollgate on a road or motorway and the other after the tollgate). The order of the transitions between these two artificial LACs (Local Area Codes) then gives the direction of transit of the mobiles.

Second Exemplary Application: Detection of an Emergency Call

The method according to the invention can also be used to detect an emergency call with the means used earlier to estimate the road traffic.

This method, along with the location of the mobile, necessitates accessing the contents of the message included in the RACH. These contents describe the establishment cause (namely the detection of the motive for the emergency call) either by demodulating the radio signal exchanged between the mobile and the base station or by using the network signaling (Abis probe).

The location of the emergency call is, for example, associated with an identification of the caller mobile, through the a priori knowledge of the identifier of the mobile (namely the TMSI). This identifier is either demodulated in the "paging response" or given by the signaling (Abis probe) enabling the network to retrieve the IMSI (International Mobile Subscriber Identity) by consulting the VLR (Visitor Location Register).

The bases of this emergency call location function are, for example:

The precise goniometry and dating of the source sending the message (above-mentioned steps 1, 2 and 3 of the method), The filtering of the RACH messages corresponding to the emergency calls either by demodulation of the radio-electrical signals or by tapping the Abis interface (steps 7 and 8 mentioned here above).

Figure 4:
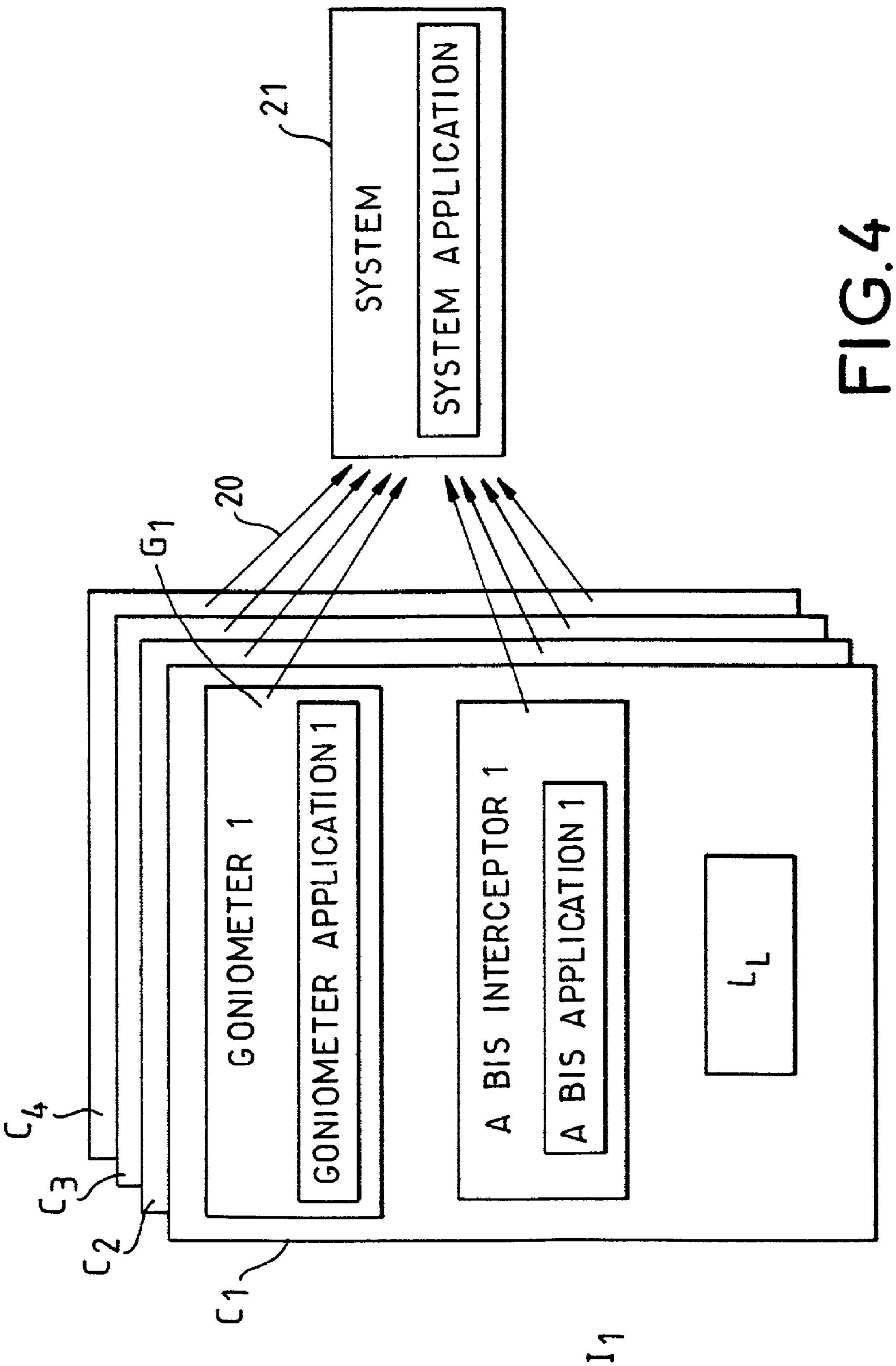
FIG. 4 shows an example of results obtained in the context of a measurement of density.

FIG. 4 is an example of a complete system formed by a set of sensors Ci, a goniometer Gi for each sensor Ci, an associated application comprising an Abis interceptor and its application, referenced li, a local application Li enabling the storage of the results and also a system 21 for the exploitation of the transferred results (arrows 20) and its associated application.

Figure 5:
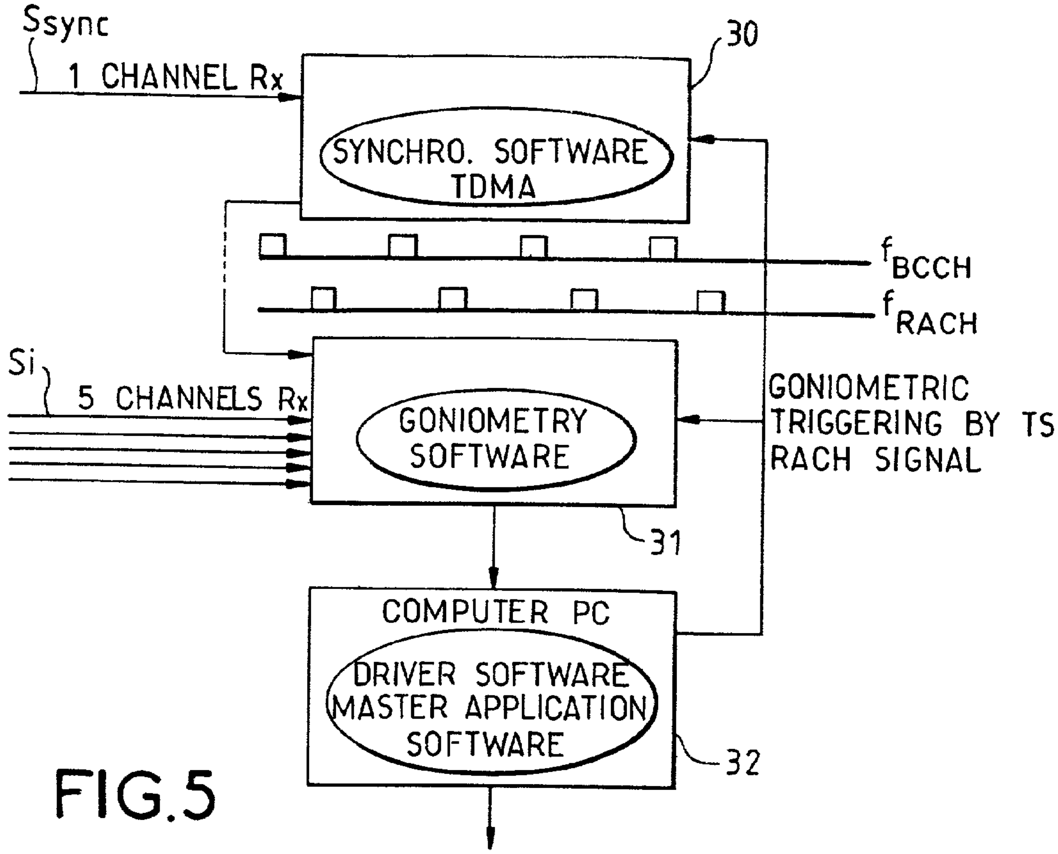
FIG. 5 shows an exemplary structure of the goniometry application.

FIG. 5 represents a possible structure for the goniometric application.

The data given by the goniometric application are essentially:

1—the precise dating of the signal and of the goniometric shot as defined here above;

2—the angular direction of the source sending out the signal and, possibly

3—the cell, the location area, the BCCH frequency, (the <<frame number>> parameter in the GSM standard), the <<Time Advance>> parameter of the mobile, by demodulation/decoding of the messages broadcast on the BCCH channels and by measurements of synchronization between RACH and BCCH, 4—the "establishment cause" and the "random access" parameters, demodulated in the RACH signals enabling them to be sorted out.

The structure has a first daughter board 30 of the type with two fast acquisition channels which receives, firstly, the synchronization signal Ssync whose function is to synchronize the acquisitions of the signal Si exchanged between a mobile and the network, secondly a piece of information from a computer 32 equipped with a driver software program or master application software program. The software program is designed to drive the acquisition of the signal exchanged on the frequency concerned by the cell on which the emergency call is sought. The daughter board is directly connected to a second board or mother board whose function especially is to process the data.

This second board or mother board 31 is provided with a goniometric software program. It receives, firstly, the synchronization beep Tsync coming from the first daughter board and the signals Si received by the antenna network of the sensor (FIG. 2), for example five channels. The goniometric software program makes it possible to obtain files containing the dates and the angular locations of the mobiles. These files are transmitted to the computer 22, which is a PC type computer for example, equipped with the tools needed to process the different pieces of information. The synchronization beep Tsync may be an SCH or Abis sync beep, or again a RACH goniometric sync beep. The goniometric measurement may also be triggered by a TS RACH signal.

Figure 6:
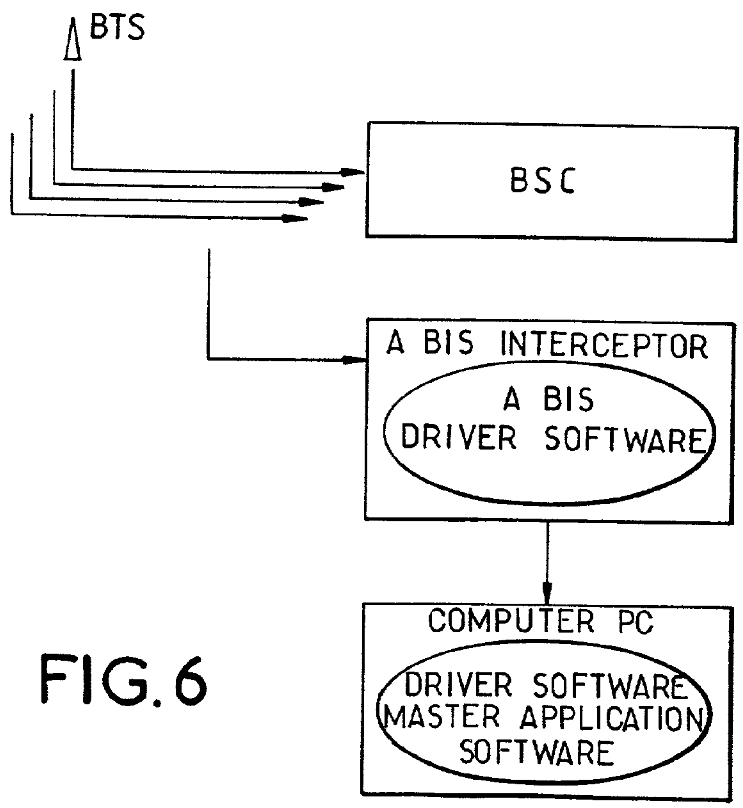
FIG. 6 shows an exemplary application to an Abis interface.

FIG. 6 represents an exemplary application of the method by using the <<Abis>> interface.

The data given by this <<Abis>> application are essentially data on:

1—The precise dating of the sending of the RACH bursts by the mobiles, a burst designating a signal element transmitted by an apparatus inside a TDMA slot, 2—The corresponding <<frame number>>, the BTS-mobile time advance parameter, 3—The BSC (Base Station Controller), the cell, the corresponding BCCH frequency, 4—The establishment cause (periodic LU or location update, emergency call), the corresponding random access parameter, the temporary mobile subscriber identity (TMSI) and the sorting out of the calls and, as the case may be 5—The parameters of the <<channel assignment>> messages pertaining to the SDCCH (Stand Alone Dedicated Control Channel) and to the TCH, especially the HSN (Hopping Sequence Number), MAIO (Mobile Allocation Index Offset), TN (Time Slot Number), starting time, etc.

6—The NRAND (Random Number), SRES (Signed Result) and other parameters, which would enable the future system to subsequently confirm the Abis data by radio access to the SDCCH messages.

The structure interfaces for example between a base station controller (BSC) and the base stations (BTS). A data exchange is made for example between the Abis interface and the structure of the goniometric application to carry out the location method.

What is claimed is:

1. A method for a detection of at least one mobile device within a communications network, said method comprising the steps of:

intercepting at least one signal exchanged between the at least one mobile device and a base station of the communications network;

acquiring a data of said at least one signal; and measuring an angle of arrival of said at least one signal, wherein the step of measuring is synchronized with a parameter of the data.

2. A method according to claim 1, further comprising a step of calling up the at least one mobile device at moments in time.

3. A method according to claim 1, further comprising a step of dating said at least one signal.

4. A method according to claim 1, further comprising a step of dating said at least one signal.

5. A method according to claim 2, further comprising a step of dating said at least one signal.

6. A method according to claim 3, wherein said step of measuring is carried out for more than one angle of arrival in order to locate at least one mobile device.

7. A method according to claim 4, wherein said step of measuring is carried out for more that one angle of arrival in order to locate at least one mobile device.

8. A method according to claim 1, further comprising a step of determining a propagation time of said at least one signal.

9. A method according to claim 2, further comprising a step of determining a propagation time of said at least one signal.

10. A method according to claim 3, further comprising a step of determining a propagation time of said at least one signal.

11. A method according to claim 7, further comprising a step of determining a propagation time of said at least one signal.

12. A method according to claim 1, further comprising a step of processing said at least one signal.

13. A method according to claim 12, wherein said processing comprises demodulating said at least one signal.

14. A method according to claim 12, further comprising a step of determining a nature of a call.

15. A method according to claim 10, further comprising a step of processing said at least one signal by demodulating said at least one signal and determining a nature of a call.

16. A method according to claim 11, further comprising a step of processing said at least one signal by demodulating said at least one signal and determining a nature of a call.

17. A method according to claim 15, further comprising a step of sorting said at least one signal based on an information from the dating step and on a data from said step of processing.

18. A method according to claim 16, further comprising a step of sorting said at least one signal based on an information from the dating step and on a data from said step of processing.

19. A method according to claim 1, further comprising a step of counting said at least one mobile device present in a geographical area in order to determine a corresponding density of said at least one mobile device.

20. A method according to claim 1, wherein said communications network is a GSM communications network.

21. A method according to claim 18, wherein said communications network is a GSM communications network.

22. A method according to claim 1, wherein said base station is a RACH type base station.

23. A method according to claim 21, wherein said base station is a RACH type base station.

24. A device configured to detect at least one mobile device in a communications network, said device comprising:

a receiver configured to intercept at least one signal exchanged between at least one mobile station and a base station in the communications network;

a synchronizer configured to synchronize an activation of a measurement of at least one angle of arrival of said at least one signal in the device; and a processor configured to process said at least one signal and configured to manage the synchronizer and the receiver.

25. A device according to claim 24, wherein said receiver is an antenna network comprising five antennas.

26. A device according to claim 24, wherein said synchronizer and said receiver are integrated in a single element.

27. A device according to claim 25, wherein said receiver comprises a goniometric antenna.

28. A device according to claim 26, wherein said processor is further configured to make goniometry shots.

29. A device according to claim 25, wherein said processor comprises a local application configured to manage an information from an interface of an Abis network.

30. A device according to claim 26, wherein said processor comprises a local application configured to manage an information from an interface of an Abis network.

31. A device according to claim 25, wherein said processor comprises a system application configured to centralize data from different local applications.

32. A device according to claim 26, wherein said processor comprises a system application configured to centralize data from different local applications.

33. A communication system for the detection of at least one mobile device within a communications network, said system comprising at least one device according to claim 31.

34. A communication system for the detection of at least one mobile device within a communications network, said system comprising at least one device according to claim 24.

35. The method according to claim 1, wherein the at least one signal is dedicated to the base station of the communications network.

36. The device according to claim 24, wherein the at least one signal is dedicated to the base station of the communications network.

37. The method according to claim 1, further comprising the step of:

detecting an emergency call from the at least one mobile device by analyzing random access channel signals (RACH).

38. The method according to claim 1, further comprising the step of:

estimating a road traffic by counting a number of mobile devices in an area.

* * * * *

UNITED STATES PATENT AND TRADEMARK OFFICE

CERTIFICATE OF CORRECTION

PATENT NO. : 6,999,728 B2
APPLICATION NO. : 10/133480
DATED : February 14, 2006
INVENTOR(S) : Delaveau et al.

It is certified that error appears in the above-identified patent and that said Letters Patent is hereby corrected as shown below:

On the title page, Item (30), the Foreign Application Priority information should read:

-- (30) Foregn Application Priority Data

Apr. 27, 2001 (FR)................................01 05734

Signed and Sealed this

Fifteenth Day of August, 2006

JON W. DUDAS
*Director of the United States Patent and Trademark Office*